C. ALLEN.
HYDRAULIC CLASSIFIER.
APPLICATION FILED FEB. 6, 1919.

1,410,152.

Patented Mar. 21, 1922.
2 SHEETS—SHEET 1.

INVENTOR
Charles Allen
BY
Strong & Townsend
ATTORNEYS

UNITED STATES PATENT OFFICE.

CHARLES ALLEN, OF EL PASO, TEXAS.

HYDRAULIC CLASSIFIER.

1,410,152.  Specification of Letters Patent. Patented Mar. 21, 1922.

Application filed February 6, 1919. Serial No. 275,280.

*To all whom it may concern:*

Be it known that I, CHARLES ALLEN, a citizen of the United States, residing at El Paso, in the county of El Paso and State of Texas, have invented new and useful Improvements in Hydraulic Classifiers, of which the following is a specification.

This invention relates to the treatment of ores and pertains especially to a receptacle in which solid particles in suspension settle and are discharged through an orifice in the bottom of the receptacle and wherein the lighter particles and the slime overflow the rim of the receptacle.

It is the object of this invention to subject the settling solid particles to a secondary classification and also to prevent the descent of the feed stream water and the slime and any fine particles that may accompany it, whereby to prevent the contamination of the classified product, as finally discharged through the orifice at the bottom of the receptacle. This is done by causing the settling solids to pass through a zone occupied by clear water. In desliming operations, the function of this water is to prevent the descent of the feed stream and any slime and fine particles that may accompany it whereby to prevent the contamination of the settling solids discharged through the bottom orifice.

Figure 2:
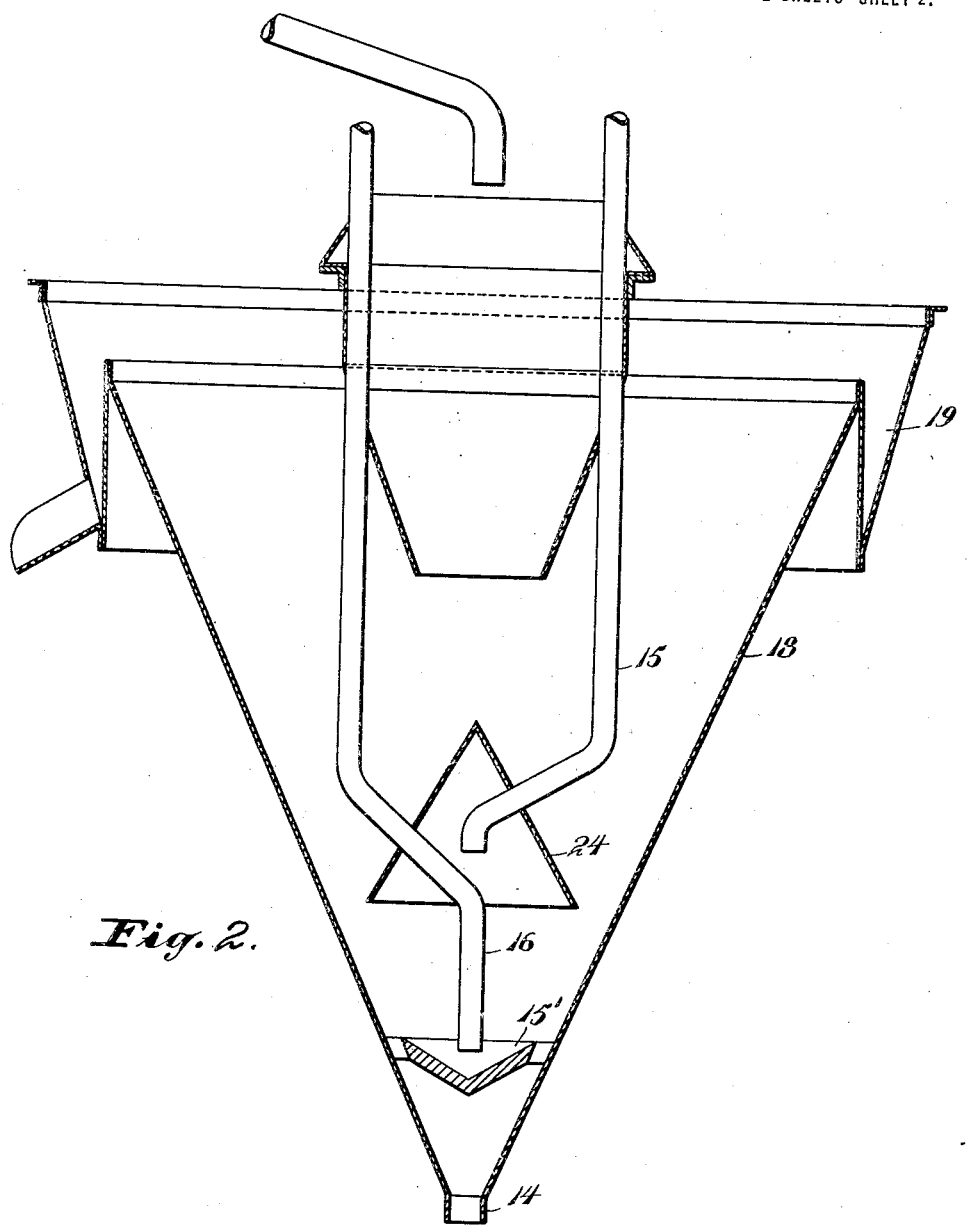
Fig. 2 is a view in central, vertical section, disclosing the present invention as adapted for use with another form of cone classifier.

In the form of the device shown in Fig. 2, one form of conical classifier is provided. This structure embodies the use of a conical receptacle 18 surrounded by an annular launder 19. Disposed at a point above the spigot 14 is a cone-shaped baffle or spreader plate 15' to prevent the rapid exit of the material from the cone and to thus insure a more effective operation thereof. Extending downwardly through the open mouth of the receptacle and terminating along the vertical axis thereof, at a point above the baffle member 15', is the inlet pipe 16.

Figure 1:
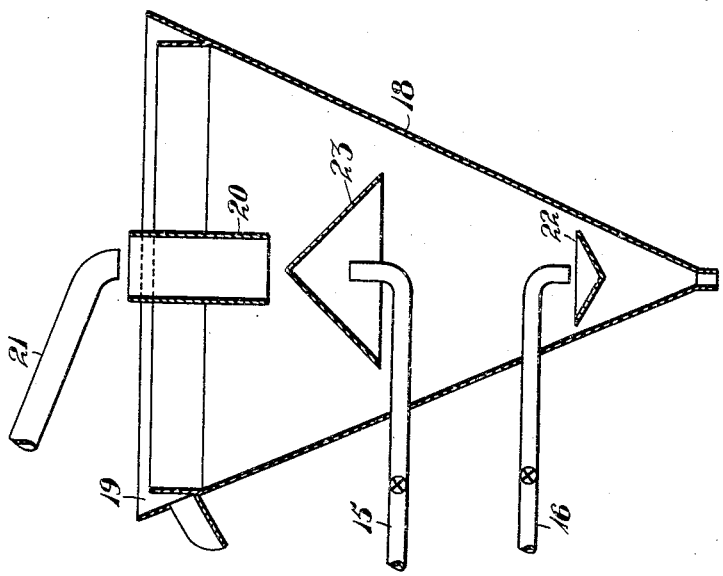
Fig. 1 is a view in central, vertical section, disclosing my device as applied to a cone classifier.

As indicated in the drawing, this pipe 16 passes through the side wall of a cone-shaped spreader 24 which corresponds in function to the spreader 23, as shown in Fig. 1, and within which the inlet pipe 15 terminates. In this instance, however, it will be noted that the outlet ends of both pipes 15 and 16 extend downwardly.

In the form of the device shown in Fig. 1, the inflowing water is distributed by the spreaders and the stream carrying the particles to be classified enters the cone through the inlet spout 21. The water and those solid particles carried with it overflow the rim of the cone and pass into the launder 19. Those particles passing downwardly into the cone are subjected to the classifying action of the water entering the cone from the pipes 15 and 16 before they reach the spigot 14.

In reviewing the details of the construction previously described and the manner in which the structure operates, it should be noted that the hydraulic water is admitted at two points and may be admitted at more, if desired, providing the water is admitted in such a manner that the jet velocity of its entrance is dissipated before it enters the sorting column or performs its classifying function. Also there being a substantial difference in their levels; the spigot discharge water is supplied through the lowermost of the pipes and the sorting column or the upper part of the receptacle, is supplied partly or wholly by water from the uppermost pipe. The water in the space between the two pipes will, therefore, be substantially at rest or may be flowing upwardly, thus producing a secondary washing of the undersized particles which have been drawn down toward the outlet spigot and thereby effecting their separation. Indeed, it has been found in a given instance, using the present device, the screen analysis of the classified product passing from the spigot shows that the minus two hundred mesh particles in the spigot discharge has been reduced 63%.

The conical spreaders 22 and 23 confine the agitation caused by the incoming streams of water, serving to scatter the streams of water towards the sides of the container so that the water quietly mixes with the contents of the tank and does not carry the classified particles in the lower part of the tank upwardly. These spreaders also prevent the force of the incoming streams from forming a central channel either upwardly towards the surface or downwardly towards the bottom discharge orifice. The formation of such channels would constitute passageways for the streams of water and thus no washing or classifying action of the contents of the tank would take place.

Having thus described my invention, what I claim and desire to secure by Letters Patent is—

A hydraulic classifier or separator for solids suspended in liquid, comprising a tank having a discharge orifice in the bottom for the heavier product, and an overflow rim for the lighter product, means for introducing a stream of water into the tank at two or more different levels, the stream at the upper level acting to subject the settling particles to a classifying action and the stream at the lower level serving to supply water to the discharge orifice in the bottom of the tank, and a conical spreader for each stream of water to distribute the force thereof and prevent agitation of the contents of the tank.

In testimony whereof I have hereunto set my hand in the presence of two subscribing witnesses.

CHARLES ALLEN.

Witnesses:
EDMUND SHAW,
ARTHUR H. SWETT.